United States Patent [19]
Little et al.

[11] Patent Number: 4,729,886

[45] Date of Patent: Mar. 8, 1988

[54] METHOD OF PREPARING REPRODUCIBLY STABLE AQUEOUS SUSPENSIONS OF SODIUM DITHIONITE FOR WOODPULP BLEACHING

[75] Inventors: Edwin D. Little, Cranford, N.J.; Karsten R. Minzghor, Porstmough, Va.

[73] Assignee: Virginia Chemicals, Inc., Portsmouth, Va.

[21] Appl. No.: 865,092

[22] Filed: May 20, 1986

[51] Int. Cl.$^4$ ............................ C01B 17/66; D21C 3/04
[52] U.S. Cl. .................................. 423/515; 252/188.22; 252/188.23; 252/188.24; 162/83
[58] Field of Search ....................... 423/515, 516, 268; 252/188.22, 188.23, 188.24; 162/181.3, 83

[56] References Cited

U.S. PATENT DOCUMENTS

| | | | |
|---|---|---|---|
| 3,536,445 | 10/1970 | Hansley et al. | 252/188.22 |
| 3,804,944 | 4/1974 | Kise et al. | 423/265 |
| 3,819,807 | 2/1972 | Schreiner et al. | 252/188.24 |
| 3,839,217 | 10/1974 | Owen et al. | 252/188.24 |
| 3,839,218 | 10/1974 | Owen et al. | 252/188.24 |
| 3,985,674 | 10/1976 | Ellis et al. | 423/515 |
| 4,283,303 | 8/1981 | Ellis | 423/515 |
| 4,534,954 | 8/1985 | Little et al. | 423/515 |
| 4,582,510 | 8/1986 | Ellis et al. | 252/188.23 |

*Primary Examiner*—Patrick P. Garvin, Sr.
*Assistant Examiner*—George R. Fourson
*Attorney, Agent, or Firm*—Depaoli & O'Brien

[57] ABSTRACT

Aqueous sodium dithionite slurries or suspensions, which are nonsettling during shipment thereof and are thereafter pumpable after storage at 32°–40° F. for at least fourteen days, comprise, on a weight basis, about 34% of sodium dithionite, about 0.17% of a xanthan gum, 5.5–6.5% of 50% sodium hydroxide, about 0.26% of a chelate, and about 1.96% of sodium tripolyphosphate which is added after adding the sodium dithionite. Preferably, the sodium tripolyphosphate is added last in making the slurry which is used as a woodpulp bleaching composition.

9 Claims, No Drawings

METHOD OF PREPARING REPRODUCIBLY STABLE AQUEOUS SUSPENSIONS OF SODIUM DITHIONITE FOR WOODPULP BLEACHING

BACKGROUND OF THE INVENTION

1. Field of the Invention

This invention relates to aqueous slurries and particularly relates to nonsettling and flowable aqueous slurries of sodium dithionite that remain in pumpable form without significant expansion, settling, or gellation. It particularly relates to the manufacture of aqueous dithionite slurries for woodpulp bleaching that have dependable and reproducible stability.

2. Review of the Prior Art

Sodium dithionite, commonly termed sodium hydrosulfite and, less correctly, sodium hyposulfite, is a powerful reducing agent that has long been used for bleaching, particularly for bleaching textiles and wood pulps such as groundwood and semi-chemical pulps.

When anhydrous sodium dithionite crystals are dissolved under either aerobic or anaerobic conditions to make a large quantity of aqueous solution, the resulting solution cannot be stored for use over a long period of time. Due to hydrolytic decomposition at the natural pH of the sodium dithionite solution, decomposition will proceed rapidly from that point by self-propagation because the decomposition products create an acidic condition which accelerates the decomposition.

Aqueous solutions of the dithionite will decompose at a commercially tolerable rate, however, if stabilized by additives such as are disclosed in U.S. Pat. Nos. 3,819,807 and 3,985,674 These additives include chelating agents, sodium carbonate, sodium tripolyphosphate, sodium hydroxide, and amines.

Although such stabilized solutions can be protected from decomposition for long enough periods for shipment and routine commercial use under suitable conditions, it has been more common practice to store the anhydrous dithionite crystals under a dry, inert gas in a sealed container. Even though the crystals are thereby acceptably stable chemically for long periods, they begin to decompose much faster as soon as exposed to the air and moisture when the container is opened for use thereof.

Furthermore, commercially available solutions of sodium dithionite are expensive to transport because they are typically at concentrations of 12-13.5%, when combined with suitable additives, and, additionally, generally require refrigeration for shipment and storage. Thus, the transport of about seven times as much water as product tends to cause the sale of this commodity to become distance-dependent. In consequence, slurries have seemed to offer an inviting means to avoid or at least to minimize the cost of storage and difficulties associated with solution forms of sodium dithionite, without decreasing the convenience that the purchaser derives from solutions.

However, the economical preparation, stabilization, handling, and shipping of such slurries is not simple. Adequate suspension without agitation, so that pumping can be done from a tank truck after shipment, is also not easy. In fact, after considering the variety of processes that are available for manufacturing sodium dithionite, including the indigenous by-products, crystal structures, and the like, the complexities of the concept are readily appreciated. Moreover, slurries have not been as widely investigated nor as commercially utilized as other forms of sodium dithionite.

U.S. Pat. No. 3,536,445 describes a process for making sodium dithionite from sodium-zinc alloy by initially producing zinc dithionite and then converting it to sodium dithionite by adding caustic soda. After removal of the zinc hydroxide by filtration, the dihydrate of sodium dithionite is "salted out" of the mother liquor with sodium chloride and alcohol to form a slurry.

U.S. Pat. No. 3,804,944 gives some stability storage data for 30% slurries (18.5% formate-derived and 11.5% zinc-derived sodium dithionite) containing 1-8% caustic soda (dithionite basis). Tests showed that these slurries required frequent agitation to prevent caking and handling difficulties.

U.S. Pat. No. 3,839,217 shows that by reducing the particle size of the sodium dithionite crystals and/or introducing a suspending or thickening agent into a liquid containing the crystals, such as alcoholic brine, it is possible to form a fluent, homogeneous, pourable dispersion of the solid dithionite particles which is chemically and physically stable for long periods of time, provided that a material, such as the salt in the brine and/or an alcohol, be present which suppresses the dissolution of the dithionite so that the dispersion can be stored at about 20° C. The majority of the particles should be about 0.6–0.8 micron in size. Methylcellulose, hydroxyethyl cellulose, polyvinyl alcohol, guar gum, and other common thickening, dispersing, or suspending agents can be used. The thickened dispersion exemplarily has a Brookfield viscosity of 9,000 cps and contains up to 34% $Na_2S_2O_4$.

U.S. Pat. No. 3,839,218 provides a method for maintaining a dispersion of crystalline zinc or alkali metal dithionite hydrate by continuous or periodic mechanical agitation so that the crystals can be stored for long periods without decomposition, the dispersing medium being aqueous or nonaqueous and containing a material which suppresses dissolution of the dithionite solids. The pH of the liquid must be at least 6.5, the viscosity of the dispersion must be below about 50,000 centipoises, and the suppressing material may be a water-soluble organic compound or a saturated brine or mixtures thereof. A thickening and suspending agent can be used. Suitable agents include polysaccharides, water-soluble polymers, and proteins of moderate molecular weight. Exemplary agents include guar gum, gum tragacanth, gelatin, and starch.

U.S. Pat. No. 4,283,303 (the disclosure of which is incorporated by reference) discloses a method for making substantially stable slurries containing 30–35% by weight of sodium dithionite by evaporating sodium dithionite solutions while maintaining the heating medium at 220°–250° F. and the solution and slurry at 110°–155° F. under a vacuum of at least 25 inches Hg and by promptly cooling the resultant slurry while agitating it. The vacuum is preferably 26.5–27.5 inches Hg. Zinc-derived sodiation liquor is the preferred sodium dithionite solution to which 4–5% by weight of the sodium dithionite, NaOH, and a chelator, as a stabilizing agent, are added.

Although these evaporated slurries have excellent stabilization qualities, they have developed problems with settling which has occurred over a period of 2–5 days and especially under the vibrations produced by tank car shipment. Such settling, and subsequent hardening, has resulted in shipments which could not be unloaded by pumping as would normally be done.

Slurries are utilized as foods, coatings, paints, dyes, explosives, oilwell fluids, and the like, and they often include natural or synthetic gums to form a liquid colloidal system in which the solid particles are dispersed. The gums typically impart viscosity to sols in which they are incorporated and thereby function as thickeners. Such a gum-containing fluid system, without the solid particles, is identified as a sol and is more accurately termed a hydrosol when based on water.

Numerous natural and synthetic gums are widely used for manufacturing hydrosols. Favored gums for many hydrosols are galactomannan gums such as guar gum, which is derived from the endosperm of the guar plant, *Cyamopsis tetragonolobus*. Other water-soluble gums which are increasingly utilized are the xanthonomas hydrophilic colloids, commonly termed xanthan gums, which may be produced by the action of various bacterial species of the genus Xanthonomas on carbohydrates (and like materials). The fermentation product of the reaction of the bacteria *Xanthonomas campestris*, a preferred species, on carbohydrates is commercially available as "Kelzan XC Polymer", made by Kelco Corporation of San Diego, Calif.

Xanthan gum is an excellent and widely used suspending and viscosity building agent. Some of its particular uses are in oil well fluids, paint, sprays, and cleaning fluids. Xanthan gum, however, has a few disadvantages. It is very difficult to disperse and wet in water or brine so that hydration can take place. A high degree of shear is usually necessary in order to wet each gum particle. Once dispersal and wetting are accomplished, the hydration of the gum, as evidenced by the development of viscosity, is quite rapid. Xanthan gum and guar exhibit very different rheological characteristics, have different molecular configurations, and are obtained from entirely different sources. Various proprietary xanthan gums, having slightly different molecular structures and rheological properties by use of mutant strains of *X. Campestris*, are available from several manufacturers.

A need existed for a stable dithionite hydrosol composition having such pseudoplastic properties that it would be readily storable, even though subject to vibrations during tank car or tank truck shipment to a textile mill or to a pulp mill, for example, and readily pumpable when thereafter delivered to a storage tank for dilution to a solids content of 12–13% and short-term storage until needed, such as for bleaching textiles or woodpulp. However, attempts to use both guar gum and xanthan gum as suspending agents for sodium dithionite crystals had demonstrated that they had surprisingly unpredictable tendencies to form either gels or settled slurries, even during quiescent storage, so that there was a need for a process that could produce physically stable slurries.

U.S. Pat. No. 4,534,954 (the disclosure of which is incorporated by reference) is directed to the preparation of aqueous sodium dithionite slurries which are non-settling during shipment thereof, and are thereafter pumpable. As textile bleaching compositions, the slurries comprise, on a weight basis, at least about 36% of commercial sodium dithionite, at least about 3% of sodium hydroxide, at least about 0.25% of a chelate, and at least about 0.25% of a xanthan gum. It also discloses woodpulp bleaching compositions which additionally contain sodium tripolyphosphate.

When the process of U.S. Pat. No. 4,534,954 was utilized to produce slurries for woodpulp bleaching, gelling of the slurries occurred frequently and unpredictably. There was consequently a clear need for a process, utilizing the common strain of *X. Campestris* (e.g., the Kelzan grade), that could furnish dependable and consistently reproducible slurries capable of retaining their pumpable characteristics, with no tendency toward significant expansion, settling, or gellation, under usual commercial shipping and storing conditions.

SUMMARY OF THE INVENTION

It is therefore an object of this invention to provide a process for producing dithionite slurries for use in woodpulp bleaching that are dependably and reproducibly free from gelation during storage thereof.

In accordance with this object and the principles of this invention, it has surprisingly been discovered that dithionite suspensions or slurries for woodpulp bleaching can be prepared that are as physically stable as dithionite slurries used for textile bleaching and as chemically stable as dithionite solutions when stored at 32° F. over a three-week period by adding sodium tripolyphosphate according to a specific sequence. It has further been established that the necessary procedure for preparing such physically stable dithionite slurries is to add the sodium tripolyphosphate after addition of the sodium dithionite (usually 85–92% by weight of $Na_2S_2O_4$) to the xanthan sol or after addition of the xanthan gum to the sodium dithionite solution. It is highly preferred, moreover, that the sodium tripolyphosphate be added as the last component of the formulation.

The recommended order of addition for dithionite slurry preparation is specifically as follows: (1) xanthan gum is added to water with agitation to form a hydrosol; (2) sodium hydroxide and chelate are added to this hydrosol, followed by cooling to below 45° F. e.g., 32°–40° F. (3) formate-derived sodium dithionite is added next to form a suspension and at a slow enough rate to maintain the temperature below 45° F. 4) sodium tripolyphosphate (STPP) is added; and (5) the suspension is cooled and stored at a temperature between 32° F. and 40° F.

The chelating agents used are not critical and typical chelating agents include nitrilo triacetic acid (NTA) and its sodium salts as well as ethylene diamine tetraacetic acid (EDTA) and its sodium salt.

Test samples that were acceptable at the end of a two-week test period, based on the weight of the suspension, varied over a range of 0.144–0.186% for xanthan gum, 6.32–6.46% for 50% NaOH, 0.24–0.28% for chelate, 31.20–36.80% for $Na_2S_2O_4$, and 0.5–2.5% for $Na_5P_3O_{10}$.

This addition process represents a clear and unexpected improvement over the process for preparing woodpulp bleaching suspensions that was disclosed in U.S. Pat. No. 4,534,954 because the amount of $Na_2S_2O_4$ that can be incorporated is significantly higher and any type of xanthan gum can be utilized to produce physically and chemically stable suspensions.

DISCUSSION OF EXPERIMENTAL INVESTIGATIONS

In an earlier attempt to determine the cause of gel formation in dithionite slurries for woodpulp bleaching, a sodium dithionite suspension was prepared in which sodium tripolyphosphate had been omitted. When this suspension proved to be physically stable, the sodium tripolyphosphate was then added to the sample, and the resulting suspension continued to be stable during storage. As a working hypothesis, the order of addition of the components was suspected as being a cause of gel formation, and the possibility was particularly considered that adding sodium tripolyphosphate after adding the sodium dithionite might be the answer to the problem.

The basic procedure used in earlier investigations, which uniformly resulted in gellation or separation of solid and liquid, was as follows:

The xanthan gum was added to water with good agitation and allowed to hydrolyze. Sodium tripolyphosphate, sodium hydroxide, and chelate were added to the solution and it was then cooled to 32° F. by placing it in an ice chest. The sodium dithionite was added slowly with good agitation to insure adequate wetting of the solids while maintaining the temperature at below 45° F.

The basic formulation that was successfully used for subsequent investigations according to this invention is as follows:

| COMPONENT | Wt. % |
|---|---|
| water | 57.64 |
| xanthan gum | 0.17 |
| sodium hydroxide (50%) | 5.97 |
| chelate (40% EDTA [sodium salt] or the equivalent) | 0.26 |
| formate-derived sodium dithionite (88–90% $NA_2S_2O_4$) | 34.00 |
| sodium tripolyphosphate (granular) | 1.96 |

Finally, the sodium dithionite slurry samples that were prepared during this investigation were stored in quart jars at 32° F. in an ice chest. The samples were left undisturbed except for occasionally checking them for physical stability.

EXAMPLE 1

Ten suspensions were prepared by following the basic procedure, i.e., sodium tripolyphosphate was added to the water-xanthan gum solution before adding the sodium dithionite. Of five suspensions tested on the second day, all separated into liquid and solid layers to some degree and were discarded. By the tenth day, the remaining five either separated or would not flow (i.e., gelled), so that none were acceptable.

EXAMPLE 2

Additional experiments were conducted to determine the various chemical ranges over which physically stable suspensions could be prepared. The basic procedure was followed, except that sodium tripolyphosphate was added after addition of the sodium dithionite and before placing the suspension in an ice chest for storage.

All chemicals except xanthan and water were added at a constant ratio, based on sodium dithionite. In screening experiments based on weight of the suspension, xanthan gum was varied from 0.144% to 0.186%, NaOH was varid from 5.48% to 6.46%, chelate was varied 0.24% to 0.28%, sodium dithionite was varied from 31.20% to 36.80%, and $Na_5P_3O_{10}$ was varied from 1.85% to 2.12%.

Out of 18 samples which were tested, 10 showed no separation of solid and liquid, were entirely fluid, and were acceptable at the end of 14 days. One showed minor separation but was fluid and therefore acceptable. Three exhibited no separation and were slow flowing but were nevertheless acceptable. The remaining six samples were unacceptable because of very slow flowing characteristics, gellaion, or serious separation of solid and liquid.

The acceptable samples contained 0.144–0.180% xanthan gum, 5.48–6.32% NaOH (50%), 0.24–0.28% chellte, 31.20–36.00% $Na_2S_2O_4$, and 1.85–2.08% $Na_5P_3O_{10}$ (STPP), by weight. These studies indicated that physically stable suspensions could probably be made over a relatively narrow concentration range for the tested variables.

EXAMPLE 3

A more in-depth study was made in which the xanthan concentration was varied from 0.150 wt. % to 0.180 wt. % while the sodium dithionite concentration was varied from 32% to 36% by weight. The same addition procedure and order of addition was used as in Example 2.

Fourteen runs were made, and seven samples exhibited acceptable suspensions over the entire two weeks. These acceptable samples contained 0.150–0.180% xanthan gum, 5.80–6.15% NaOH, 0.25–0.27% EDTA, 32.00–35.00 % $Na_2S_2O_4$, and 1.90–2.02% $Na_5P_3O_{10}$ (STPP). Two others were acceptable at the end of the two weeks but showed very slow flowing behavior in the middle of the test period.

The results of these investigations indicated that a basic formulation containing 0.165% by weight of xanthan and about 34% by weight of sodium dithionite would be likely to be physically stable, with somewhat higher connentrations of these chemicals being usable without adverse affects but with lower levels thereof probably resulting in a product that would not be physically stable.

EXAMPLE 4

An additional series of tests was run to investigate the effects of concentration of sodium hydroxide and sodium tripolyphosphate on physical stability of the suspensions or slurries. In these tests, concentrations of all other chemicals were held constant while sodium tripolyphoshate was varied by 0.5% increments from 0.5% to 7.0% by weight. Specifically, sodium dithionite was held at 34.00% by weight, sodium hydroxide was maintained at 5.97%, xanthan was held as 0.165% by weight, and chelate was held at 0.26% by weight. Water was added to the remainder so that the addition of all ingredients gave 100% totals.

Two samples exhibited minor separation of solid and liquid but were fluid and acceptable. None of the remaining seven runs was acceptable. Two showed serious separation of solid and liquid. Two others showed no separation but were very slow flowing, i.e., they gelled, and the remainder showed both separation and gellation. The acceptable runs contained 0.5% and 1.0% $Na_5P_3O_{10}$.

EXAMPLE 5

A series of tests was run to investigate the effects of concentration of sodium hydroxide and sodium tripolyphosphate on physical stability of the resulting suspensions. In these tests, concentrations of all other chemical were held constant while sodium hydroxide was varied from 1.00% to 7.00% by weight. Specifically, sodium dithionite was at 34.00%, xanthan was at 0.165%, chelate was at 0.26%, and sodium tripolyphosphate was at 1.96%. The balance was water in everly instance.

These results are shown in Table 1

TABLE 1

| Test No. | % H₂O | % NaOH (50%) | Observations 7th day | 14th Day |
|---|---|---|---|---|
| 1 | 62.615 | 1.00 | 1 | Decomposed |
| 2 | 61.615 | 2.00 | 5 | Decomposed |
| 3 | 60.615 | 3.00 | 5 | 5 |
| 4 | 59.615 | 4.00 | 5 | 5 |
| 5 | 55.615 | 8.00 | 5 | 5 |
| 6 | 54.615 | 9.00 | 5 | 5 |
| 7 | 59.115 | 4.50 | 5 | 5 |
| 8 | 58.615 | 5.00 | 4 | 4 |
| 9 | 58.115 | 5.50 | 4 | 3 |
| 10 | 57.615 | 6.00 | 4 | 3 |
| 11* | 57.115 | 6.50 | 3 | 1 |
| 12 | 56.615 | 7.00 | 4 | 1 |

*Denotes acceptable suspensions over entire two weeks.
Note 1: No separation of solid and liquid, fluid - acceptable.
Note 2: Minor separation of solid and liquid, fluid - acceptable.
Note 3: No separation of solid and liquid, slow flowing - acceptable.
Note 4: No separation of solid and liquid, very slow flowing - not acceptable.
Note 5: No separation of solid and liquid, would not flow - not acceptable.
Note 6: Separation of solid and liquid, fluid - not acceptable.
Note 7: Separation of solid and liquid, would not flow - not acceptable.

Results of this investigation show that adding 5.5-6.5% by weight of sodium hydroxide, in combination with specific amounts of the other slurry components, provided acceptable dithionite slurries at the end of the two-week test period. However, three flowed very slowly and hence were not acceptable at the end of the first week. The only sample which was acceptable over the entire period contained 6.50% NaOH.

EXAMPLE 6

Six test samples were prepared, using the basic addition order of Example 1 for three samples and using the addition order of Examples 2-5 for the remainder. More specifically, water, xanthan, STPP, NaOH, chelate, and sodium dithionite were sequentially added to make the first three samples. Water, xanthan, NaOH, chelate, sodium dithionite, and STPP were sequentially added to make the second three samples. All samples were stored in an ice chest and were checked for physical stability after seven days by visual inspection. No sample showed separation of liquids and solids. All of the first three samples had gelled, and all of the second three samples were fluid. These results indicated that sodium tripolyphosphate must be added after sodium dithionite and preferably should be added last in the preparation of a sodium dithionite suspension with xanthan.

EXAMPLE 7

Nine test samples were prepared and stored in an ice chest at 32° F. using the following formulation:

| COMPONENT | Wt. % |
|---|---|
| water | 57.65 |
| xanthan gum | 0.165 |
| sodium hydroxide (50%) | 5.97 |
| chelate (40% EDTA [sodium salt] or the equivalent) | 0.26 |
| format-derived sodium dithionite (88-90% Na₂S₂O₄) | 34.00 |
| sodium tripolyphosphate (granular) | 1.96 |

These samples were prepared in the same manner as described for Example 4 except that a nitrogen blanket was employed during the addition of the sodium dithionite and the sodium tripolyphosphate. The test samples were initially assayed for sodium dithionite and then stored in an ice chest. The samples were assayed periodically for sodium dithionite by dissolving a portion of the suspension in a formaldehyde-sodium carbonate solution and then titrating an aliquot of this solution with a standard iodine solution.

Three of these samples were checked for chemical stability after seven days, three more after fourteen days, and the final three after twenty-one days. Physical stability was checked every seven days for all samples. Results indicated that the suspensions were physically stable for a fourteen-day period; however, at twenty-one days there was a 3-5% clear liquid layer at the top of the sample because of settling of the solids. These samples flowed completely, however, with no signs of the solids packing on the bottom. All were acceptable.

The average loss in sodium dithionite, for the nine samples, was 4.7% with a standard deviation of 3.3%. The large variance in the assays were probably due to difficulty in obtaining a truly representative sample of the suspension. These results indicated that these suspensions would be no less stable, chemically, than a sodium dithionite solution stored under similar conditions.

What is claimed is:
1. A method for reproducibly preparing a storable and pumpable aqueous dithionite suspension which contains sodium dithionite and is useful for woodpulp bleaching, said method comprising the following steps, based on weight percentages of said suspension:
   A. preparing a dilute hydrosol containing about 0.144-0.180% of xanthan gum;
   B. sequentially adding 5.48-6.32% of 50% sodium hydroxide and 0.24-0.28% of a chelate to said dilute hydrosol;
   C. cooling said hydrosol to below 45° F. to form a cold dilute hydrosol;
   D. adding 31.20-36.00% sodium dithionite, containing 88-90% Na₂S₂O₄, to said cold dilute hydrosol at such a rate as to maintain its temperature below 45° F. to form a suspension; and
   E. adding 1.85-2.00% of sodium tripolyphosphate to said suspension to form said storable and pumpable aqueous dithionite suspension.

2. The method of claim 1, wherein said sodium tipolyphosphate is 1.96% by wt.

3. The method of claim 1, wherein said 50% sodium hydroxide is added in sufficient amount to provide said suspension containing about 3.0% by wt. of pure sodium hydroxide.

4. A method for making a storable and pumpable aqueous dithionite suspension for woodpulp bleaching, which is physically stable at storage temperatures of 32°-40° F. for at least fourteen days by adding sodium dithionite to a hydrosol of water and xanthan gum and subsequently adding sodium tripolyphosphate thereto, said suspension additionally comprising sodium hydroxide and a chelate, said xanthan gum being 0.144-0.18 wt. % of said suspension and said sodium dithionite being 31.2-36.0 wt. % of said suspension.

5. The method of claim 4, wherein said sodium hydroxide is added to said hydrosol as a 50% solution, said solution being approximately 6% by weight of said suspension.

6. The method of claim 5, wherein said sodium tripolyphosphate is added in sufficient amount to provide about 2% of sodium tripolyphosphate in said suspension.

7. The method of claim 6, wherein said chelate is added in sufficient amount to provide 0.24-0.28 weight % in said suspension and contains approximately 40% sodium ethylene diamine tetraacetate.

8. The method of claim 4, wherein said sodium dithionite contains 88-90% by wt. of Na₂S₂O₄.

9. The method of claim 6, wherein said sodium tripolyphosphate is granular.

* * * * *

UNITED STATES PATENT AND TRADEMARK OFFICE
CERTIFICATE OF CORRECTION

PATENT NO. : 4,729,886

DATED : March 8, 1988

INVENTOR(S) : Edwin D. Little and Karsten R. Minzghor

Page 1 of 2

It is certified that error appears in the above-identified patent and that said Letters Patent is hereby corrected as shown below:

Column 1, line 34, change "3,985,674" to --3,985,674.--.

Column 3, line 18, change "Xanthonomas" to --Xanthonomas--.

Column 5, line 58, change "varid" to --varied--.

Column 6, line 1, change "gellaion" to --gellation--.

Column 6, line 5, change "chellte" to --chelate--.

Column 6, line 31, change "connentrations" to --concentrations--.

Column 6, line 62, change "chemical" to --chemicals--.

Column 6, line 67, change "everly" to --every--.

Column 7, line 58, change "format" to --formate--.

Claim 1, col. 8, line 35, change "2.00" to --2.08--.

UNITED STATES PATENT AND TRADEMARK OFFICE
CERTIFICATE OF CORRECTION

PATENT NO. : 4,729,886

DATED : March 8, 1988

INVENTOR(S) : Edwin D. Littel and Karsten R. Minzghor

It is certified that error appears in the above-identified patent and that said Letters Patent is hereby corrected as shown below:

Claim 2, col. 8, lines 38 and 39, change "tipolyphosphate" to --tripolyphosphate--.

Signed and Sealed this

Ninth Day of August, 1988

Attest:

DONALD J. QUIGG

Attesting Officer

Commissioner of Patents and Trademarks